United States Patent Office 3,433,801
Patented Mar. 18, 1969

3,433,801
1-ARYL-3-(N-LOWER ALKYL AMINO) PYRROLIDINES
Norman D. Dawson, Richmond, Va., assignor to A. H. Robins Company, Incorporated, Richmond, Va., a corporation of Virginia
No Drawing. Filed Mar. 22, 1966, Ser. No. 536,264
U.S. Cl. 260—326.3      10 Claims
Int. Cl. C07d 27/04

ABSTRACT OF THE DISCLOSURE

1 - aryl - 3-lower-alkylamino-pyrrolidines, useful intermediates also having pharmacological activity as bronchodilators and antifibrilatory agents.

---

The present invention relates to certain novel heterocyclic organic compounds which may be referred to as 3-aminopyrrolidines, and is more particularly concerned with 1-aryl-3-lower-alkylaminopyrrolidines, and a method of making the same.

The invention is especially concerned with novel compounds having the formula:

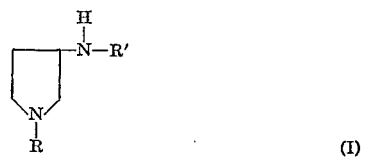

(I)

wherein R is selected from the group consisting of phenyl, lower-alkylphenyl, lower-alkoxyphenyl, halophenyl, and trifluoromethylphenyl and wherein R' is lower-alkyl, and acid addition salts thereof.

The compounds of the invention are useful as bronchodilators and antifibrilatory agents.

The compounds of the invention having the foregoing Formula I are also useful intermediates in the preparation of certain novel imidazolidinone compounds by reaction with phosgene and heating the resulting product to cleave the ring and form a 4-beta-haloethyl-1,3-disubstituted-2-imidazolidinone, which may then be reacted with a primary or secondary amine, e.g., morpholine, dimethylamine, or diethylamine, to produce the corresponding 4-beta-aminoethyl-1,3-disubstituted-2-imidazolidinone compound. Both the halo and the amino imidazolidinone compounds are analeptics, hypotensives, or both. Certain compounds of the imidazolidinone series are potent and long-lasting analeptics, stimulating respiration and antagonizing central nervous system depression and exhibiting a particularly durable antagonism against barbiturate-induced depression or poisoning at dose levels considerably below that at which untoward side effects occur.

It is accordingly an object of the present invention to provide new and useful 1-aryl-3-lower-alkylaminopyrrolidines, and a method of making the same. Other objects of the invention will be apparent to one skilled in the art, and still other objects will become apparent hereinafter.

In the definition of symbols in the foregoing Formula I and where they appear elsewhere throughout this specification, the terms have the following significance.

The term "lower-alkyl" as used herein includes straight and branched chain radicals of up to eight carbon atoms inclusive and is exemplified by such groups as methyl, ethyl, propyl, isopropyl, butyl, sec. butyl, tertiary butyl, amyl, isoamyl, hexyl, heptyl, octyl and the like. "Lower-alkoxy" has the formula -O-lower-alkyl.

Among the suitable radicals within the scope of R are phenyl radicals either unsubstituted or substituted by any radical or radicals which are not reactive or otherwise interfering under the conditions of reaction, such as lower-alkoxy, lower-alkyl, tri-fluoromethyl, halo, and the like. The substituted phenyl radicals have preferably no more than one to three substituents such as those given above and, furthermore, these substituents can be in various available positions of the phenyl nucleus and, when more than one substituent is present, can be the same or different and can be in various position combinations relative to each other. The lower-alkyl and lower-alkoxy substituents each have preferably one to four carbon atoms which can be arranged as straight or branched chains.

The compounds of Formula I may be converted to and are conveniently stored and frequently employed in the form of acid addition salts. Such salts also have improved water-solubility. When used as intermediates for pharmaceutical products the non-toxic salts are preferred, but any salt may be prepared and used as a chemical intermediate. The free basic compounds of Formula I may be conveniently converted to their acid addition salts by reaction of the free base with the selected acid, preferably in the presence of an organic solvent inert to the reactants and reaction products under the conditions of the reaction.

Appropriate acid addition salts are those derived from mineral acids such as hydrochloric acid, hydrobromic acid, hydroiodic acid, nitric acid, sulfuric acid, sulfamic acid, and phosphoric acid; and organic acids such as acetic acid, citric acid, lactic acid, fumaric acid, and tartaric acid. The preferred acid addition salt is the hydrochloride.

The acid addition salts are prepared either by dissolving the free base in an aqueous solution containing the appropriate acid and isolating the salt by evaporating the solution, or by reacting the free base and the selected acid in an organic solvent, in which case the salt ordinarily separates directly or can be conventionally recovered by concentration of the solution or the like. Conversely the free base may be obtained conventionally by neutralizing the acid addition salt with an appropriate base such as ammonia, ammonium hydroxide, sodium carbonate or the like, extracting the liberated base with a suitable solvent, illustratively ethyl acetate or benzene, drying the extract and evaporating to dryness or fractionally distilling, or in other conventional manner.

One method for the preparation of the compounds of the invention may be illustrated as follows:

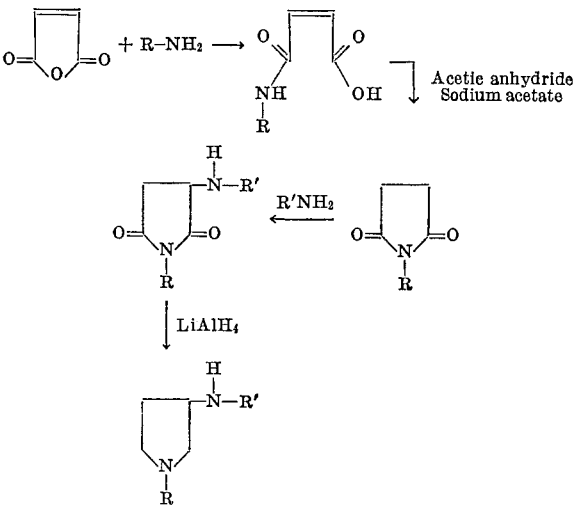

wherein R and R' have the values previously assigned.

According to the method of the invention, maleic anhydride is reacted with aniline or a ring-substituted aniline. The reaction product is then treated with acetic anhydride in acetic acid containing a small amount of sodium acetate to form a maleimide. The reaction product is subsequently treated by the addition of methylamine or other desired lower-alkylamine to form the intermediate aspartimide, followed by reduction thereof to the desired 3-(N-lower-alkylamino)-1-substituted pyrrolidine with lithium aluminum hydride in a suitable aprotic solvent such as tetrahydrofuran. The free base may then be isolated as such and, if desired, converted to the acid salt, as by reaction with hydrochloric acid.

As an alternative method, an aryl sulfonate, e.g., the benzene sulfonate or p-toluenesulfonate, of a selected 1-R-3-pyrrolidinol is reacted, preferably in a suitable aprotic solvent, with a lower-alkyl amine of the formula R'—NH$_2$, R and R' having the values previously assigned, to produce the desired 3-(N-lower-alkylamino)-1-substituted pyrrolidine corresponding to Formula I in the foregoing, including, if desired, acid addition salts thereof.

The following examples are given by way of illustration only and are not to be construed as limiting.

Example 1.—3-(N-butylamino)-1-phenylpyrrolidine

Procedure A—N-phenylmaleamic acid (maleanilic acid).—To a stirred solution of 57.5 g. (0.586 mole) of maleic anhydride in 400 ml. of benzene was added dropwise a solution of 50.0 g. (0.536 mole) of aniline in 100 ml. of benzene. The addition time was one hour, the N-phenylmaleamic acid separating almost immediately. After stirring for three hours to insure complete reaction, the product was collected and air-dried to constant weight. A yield of 104.2 gm. (93.3%) of product melting at 209–210° C. was obtained.

N-phenylmaleimide.—A mixture of 87.3 gm. (0.456 mole) of maleanilic acid, 16.3 gm. of sodium acetate and 153 ml. of acetic anhydride was heated with stirring on a steam bath. Solution of solids gradually occurred with complete solution occurring at a pot temperature of 85° C. The mixture was kept at a maximum pot temperature of 87° C. for fifteen minutes and then allowed to stand for one hour without application of heat. The reaction mixture was diluted with four volumes of cold water, thereby precipitating the product as fine yellow feathery needles. The dried product weighed 61.0 gm. (77.2%) and melted at 87–90° C.

3-(n-butyl)-1-phenyl-aspartimide.—A solution of 50 gm. (0.289 mole) of N-phenylmaleimide in 175 ml. of benzene was treated with 21.1 gm. (0.289 mole) of n-butylamine which was added in one portion. Heat evolution occurred with a color change from yellow to light red. The solution was refluxed for one hour and then diluted, while still hot, with approximately three volumes of petroleum ether. As the solution cooled, the product separated as white glistening plates. After one hour at room temperature, the product was collected and dried. The product melted at 99–101° C. and weighed 43.8 gm. (62.5%).

3 - (N-n-butylamino)-1-phenylpyrrolidine.—A solution of 42.2 gm. (0.171 mole) of 3-(n-butyl)-1-phenylaspartimide in 350 ml. of dry benzene was added dropwise over a period of 2¼ hours to a well-stirred slurry of 9.7 gm. (0.256 mole) of lithium aluminum hydride and 200 ml. of dry ether. The yellow reduction mixture was stirred and refluxed for five hours. After carefully treating the cooled reduction mixture with water, the mixture was filtered free of solids, the filtrate concentrated and a rapid distillation of the residue carried out at oil pump vacuum. The crude distillate was carefully redistilled to give 17.2 gm. (46.3%) of product boiling at 128–134° C./0.08–0.15 mm.

Example 2.—3-(N-methylamino)-1-phenylpyrrolidine

Procedure B—1-phenyl-3-pyrrolidinol.—1,4-dichloro-2-butanol (71.5 g.; 0.5 mole) and 93 g. (1 mole) of aniline were heated under nitrogen. When the temperature reached 140° C. an exothermic reaction set in with the pot temperature increasing rapidly to 300° C. The pot temperature was lowered to 140° C. by application of an ice bath, at which temperature the reaction was allowed to continue for four hours. The cooled reaction mixture was treated with 350 ml. of water and the mixture extracted several times with ether. The aqueous layer was made basic with 50% sodium hydroxide solution and the base-insoluble oil extracted with ether. The dried ether solution was concentrated and the residual oil distilled under vacuum using a short Vigreaux column. 55 g. (67%) of distillate was collected at 107° C. at 0.01 mm. The distillate solidified in the receiver and was crystallized from benzene to give a colorless crystalline solid which melted at 95–97° C.

p-Methylbenzene sulfonate ester of 1-phenyl-3-pyrrolidinol.—1-phenyl-3-pyrrolidinol (2.0 moles) is added dropwise to a stirred suspension of 78 g. (2 moles) of sodamide in one liter of dry toluene. The rate of addition is adjusted to maintain a pot temperature of about 35° C. After stirring one hour, a solution of 381 g. (2 moles) of p-methylbenzene sulfonyl chloride in 2.5 liters of dry toluene is added, keeping the pot temperature below 30° C. by using an ice bath. The reaction mixture is stirred for 2.5 hours and 500 ml. of water added carefully to decompose unreacted sodamide. The mixture is washed two times with one-liter portions of water, the organic layer separated, dried over sodium sulfate, filtered, and the volume of the filtrate adjusted to three liters.

3-(N-methylamino)-1-phenylpyrrolidine.—300 ml. of a toluene solution of the p-methylbenzene sulfonate ester of 1-phenyl-3-pyrrolidinol (ca. 0.2 mole of sulfonate ester) is concentrated on a rotary evaporator. The residue is mixed with one mole of methylamine dissolved in a minimum amount of toluene. The mixture is heated in a stainless steel autoclave for 1.5 hours at 120–140° C. and then for two hours at 180° C. The cooled mixture is removed from the autoclave and partitioned between 200 ml. of dilute sodium hydroxide and 200 ml. of toluene. The toluene layer is dried over sodium sulfate, filtered, and concentrated using a water pump. Distillation of the oily residue gives 3-(N-methylamino)-1-phenylpyrrolidine as an oil.

Related products having different N-lower-alkyl (R') groups are prepared in the same manner by employing the selected starting lower-alkylamine in the appropriate step of either one of the foregoing Procedures A and B, i.e., the second last step of Procedure A and the last step of Procedure B, in a manner which will be apparent to one skilled in the art.

Example 3.—3-(N-methylamino)-1-phenylpyrrolidine and acid addition salts thereof N-methyl-1-phenylaspartimide.—To a stirred solution of 22.0 gm. (0.127 mole) of N-phenylmaleimide in 100 ml. of toluene at 10° C. was added dropwise 60 ml. of toluene containing a 10% molar excess of methylamine. The pot temperature rose to 22° C. during the addition with separation of the adduct. After stirring for one-half hour at room temperature, the product was collected, washed with toluene and dried to constant weight in a vacuum oven. The yield of white crystalline product melting at 133–135° C. was 23.9 gm. (92.3%).

3 - (N-methylamino)-1-phenylpyrrolidine.—A solution of 43.8 gm. (0.214 mole) of N-methyl-1-phenyl-aspartimide in 400 ml. of dry tetrahydrofuran, maintained at 35–40° C. to keep the compound in solution, was added dropwise over a period of 1.5 hours to a well-stirred slurry of 12.1 gm. (0.32 mole) of lithium aluminum hydride and 200 ml. of dry tetrahydrofuran. After a three hour reflux period the reaction mixture was decomposed by the careful addition of cracked ice. The mixture was filtered, concentrated, the residual oil dissolved in ether, and the ether solution washed twice with water. After drying over sodium sulfate, the ether solution was concentrated and the residual oil distilled at oil pump vacuum. The yield of 3-(N-methylamino)-1-phenylpyrrolidine distilling at 115° C./0.10 mm. was 12.6 gm. (33.5%).

The hydrochloride salt was prepared by the addition of hydrochloric acid to an ethanol solution of the base. After recrystallization from ethanol, the salt melted at 209–211° C.

*Analysis.*—Calc. for $C_{11}H_{17}N_2Cl$: C, 58.65; H, 6.71; N, 6.22. Found: C, 58.68; H, 6.72; N, 6.35.

Example 4.—3-(N-ethylamino)-1-(3-methylphenyl)-pyrrolidine

Using the method of Example 1, maleic anhydride is mixed and reacted together with an equimolar amount of 3-methylaniline and the resulting maleamic acid cyclized to the corresponding N-substituted maleimide, which is then treated with ethylamine to give the corresponding aspartimide, which is then reduced with lithium aluminum hydride to give the desired 3-(N-ethylamino)-1-(3-methylphenyl)-pyrrolidine.

Example 5.—3-(N-isopropylamino)-1-(3-methoxyphenyl)-pyrrolidine

Using the method of Example 1, maleic anhydride is mixed and reacted together with an equimolar amount of 3-methoxyaniline and the resulting maleamic acid cyclized to the corresponding N-substituted maleimide, which is then treated with isopropylamine to give the corresponding aspartimide, which is subsequently reduced with lithium aluminum hydride to give the desired 3-(N-isopropylamino)-1-(3-methoxyphenyl)-pyrrolidine.

Example 6.—3-(N-n-butylamino)-1-(4-chlorophenyl)-pyrrolidine

Using the method of Example 1, maleic anhydride is mixed and reacted together with an equimolar amount of 4-chloroaniline and the resulting maleamic acid cyclized to the corresponding N-substituted maleimide, which is then treated with n-butylamine to give the corresponding aspartimide, which is in turn reduced with lithium aluminum hydride to give the desired 3-(N-n-butylamino)-1-(4-chlorophenyl)-pyrrolidine.

Example 7.—3-(N-methylamino)-1-(4-trifluoromethylphenyl)-pyrrolidine

Using the method of Example 1, maleic anhydride is mixed and reacted together with an equimolar amount of 4-trifluoromethylaniline and the resulting maleamic acid cyclized to the corresponding N-substituted maleimide, which is then treated with methylamine to give the corresponding aspartimide, which is reduced with lithium aluminum hydride to give the desired 3-(N-methylamino)-1-(4-trifluoromethylphenyl)pyrrolidine.

It is to be understood that the invention is not to be limited to the exact details of operation or exact compounds shown and described, as obvious modifications and equivalents will be apparent to one skilled in the art, and the invention is therefore to be limited only by the scope of the appended claims.

I claim:

1. A compound selected from the group consisting of 3-(N-lower-alkylamino)-1-phenylpyrrolidines having the formula

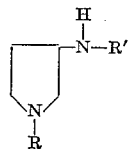

wherein R is selected from the group consisting of phenyl, lower-alkylphenyl, lower-alkoxyphenyl, halophenyl, and trifluoromethylphenyl, and wherein R' is lower-alkyl, and acid addition salts thereof.

2. A compound of claim 1 which is a 3-(N-lower-alkylamino)-1-lower-alkylphenylpyrrolidine.

3. A compound of claim 1 which is a 3-(N-lower-alkylamino)-1-lower-alkoxyphenylpyrrolidine.

4. A compound of claim 1 which is a 3-(N-lower-alkylamino)-1-halophenylpyrrolidine.

5. A compound of claim 1 which is a 3-(N-lower-alkylamino)-1-trifluoromethylphenylpyrrolidine.

6. A compound of claim 1 which is 3-(N-methylamino)-1-phenylpyrrolidine.

7. A compound of claim 1 which is a 3-(N-methylamino)-1-phenylpyrrolidine acid addition salt.

8. A compound of claim 1 which is 3-(N-n-butylamino)-1-phenylpyrrolidine.

9. A compound of claim 1 which is a 3-(N-lower-alkylamino)-1-phenylpyrrolidine.

10. A compound of claim 1 which is a 3-(N-lower-alkylamino)-1-phenylpyrrolidine acid addition salt.

References Cited

Fegley et al.: J. American Chem. Society, vol. 79, pp. 4144–6 (1957).

ALEX MAZEL, *Primary Examiner.*

JOSE TOVAR, *Assistant Examiner.*

U.S. Cl X.R.

260—326.5, 326.85; 167—65

UNITED STATES PATENT OFFICE
CERTIFICATE OF CORRECTION

Patent No. 3,433,801                                    March 18, 1969

Norman D. Dawson

It is certified that error appears in the above identified
patent and that said Letters Patent are hereby corrected as
shown below:

Column 2, lines 52 to 56, the right-hand formula should
appear as shown below:

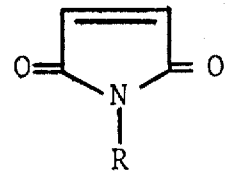

Signed and sealed this 10th day of March 1970.

(SEAL)
Attest:

Edward M. Fletcher, Jr.                    WILLIAM E. SCHUYLER, JR.
Attesting Officer                              Commissioner of Patents